United States Patent
Haka

(10) Patent No.: US 6,447,422 B1
(45) Date of Patent: Sep. 10, 2002

(54) DUAL MODE, GEARED NEUTRAL CONTINUOUSLY VARIABLE TRANSMISSION

(75) Inventor: Raymond James Haka, Brighton, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/759,883

(22) Filed: Jan. 16, 2001

(51) Int. Cl.[7] .......................... F16H 37/02; F16H 9/26
(52) U.S. Cl. ....................................... 475/211; 475/210
(58) Field of Search .............................. 475/211, 210, 475/218, 212, 207, 208, 219, 269, 276, 198, 280, 82; 180/248; 477/45

(56) References Cited

U.S. PATENT DOCUMENTS

| | | | |
|---|---|---|---|
| 4,644,820 A | | 2/1987 | Macey et al. ............... 74/689 |
| 5,803,858 A | * | 9/1998 | Haka ......................... 475/210 |
| 5,879,263 A | * | 3/1999 | Haka ......................... 475/276 |
| 5,895,335 A | * | 4/1999 | Haka ......................... 475/210 |
| 6,093,125 A | * | 7/2000 | McCarrick et al. ......... 475/210 |

FOREIGN PATENT DOCUMENTS

GB 2 045 368 A 10/1980

* cited by examiner

Primary Examiner—Douglas C. Butler
(74) Attorney, Agent, or Firm—Leslie C. Hodges

(57) ABSTRACT

A powertrain has a continuously variable transmission that incorporates a continuously variable unit in the form of a belt drive, a summing differential gearing assembly in the form of a planetary gear set and a plurality of torque transmitting mechanisms. A continuous mechanical input path is provided between an engine and one member of the summing differential gearing assembly. One of the torque transmitting mechanisms are selectively engaged to provide a low continuously variable reverse range, neutral condition and a continuously variable low forward range between the transmission input and output shafts. Another of the torque transmitting mechanisms is selectively engaged to establish a continuously variable high forward range between the transmission input and output shafts. A third torque transmitting mechanism is selectively engaged to establish a fixed mechanical ratio drive path between the transmission input and output shafts. The fixed mechanical ratio may be utilized during the high forward range if desired to provide an efficient operating ratio.

12 Claims, 2 Drawing Sheets

DUAL MODE, GEARED NEUTRAL CONTINUOUSLY VARIABLE TRANSMISSION

TECHNICAL FIELD

This invention relates to continuously variable transmissions (CVT) with a geared neutral condition.

BACKGROUND OF THE INVENTION

Continuously variable transmissions generally employ a continuously variable unit (CVU) such as a belt and sheave mechanism, electric motor/generator systems, or hydraulic pump/motor systems. The electrical and hydraulic units can achieve a neutral condition by simply not supplying energy to the drive unit (i.e. the motor). Belt and sheave mechanisms however, must incorporate either a clutch mechanism or a summing differential gearing assembly that will permit the output speed to be zero while the input speed is not zero.

One such unit can be found in U.S. Pat. No. 4,644,820 issued to Macey and Vahabzadeh (Macey et al.) on Feb. 24, 1987. This patent incorporates two selectively engageable friction clutches and one one-way clutch, in the mechanical power path, between the input shaft, driven by a prime mover, and an input member of the summing differential gearing assembly. The CVU output is continuously connected with another input member of the summing differential gearing assembly. To achieve a high ratio drive through the CVU, the input clutches in the mechanical power path must be disengaged.

The Macey et al. patent does not permit a mechanical high range drive condition. Thus, the efficiency loss of the CVU is always present during the operation of the CVT. The incorporation of two friction clutches and a one-way clutch adds to the complexity of the transmission without additional benefit from the mechanical power path. Also this patent requires a total of three selectively engageable clutches and a one-way clutch to establish a low range and a high range of operation.

SUMMARY OF THE INVENTION

It is an object of the present invention to provide an improved continuously variable transmission.

In one aspect of the present invention, a variable ratio belt drive path, a direct mechanical drive path, and a planetary gear set are disposed in a power path between an input shaft and an output shaft to provide a geared neutral condition, a forward continuously variable range and a reverse continuously variable range. In another aspect of the present invention, the planetary gear set operates as a summing differential gearing assembly or unit during a low forward range and a reverse range and is bypassed during a continuously variable high forward range during which only the variable ratio belt drive path is active.

In yet another aspect of the present invention, a discrete mechanical path is provided between the input shaft and the output shaft in bypassing relation with the summing differential gearing assembly. In still another aspect of the present invention, the discrete mechanical path provides a discrete ratio at a point within the continuously variable high forward range or at the upper end of the continuously variable high forward range to thereby establish an efficient operating point in the power path.

DESCRIPTION OF THE EXEMPLARY EMBODIMENTS

Figure 1:
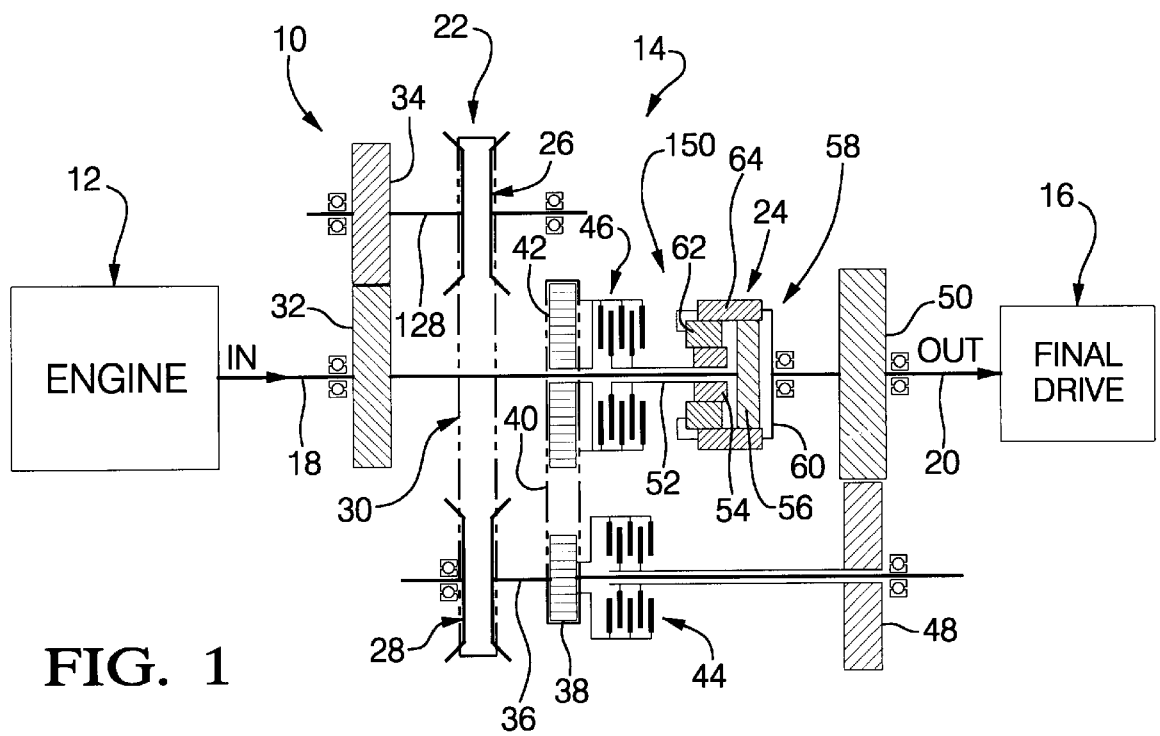
FIG. 1 is a schematic representation of an embodiment of a CVT incorporating the present invention.

A powertrain 10, illustrated in FIG. 1, has an engine 12, a continuously variable transmission (CVT) 14, and a final drive 16. The engine 12 and final drive 16 are conventional mechanical assemblies that are well-known as to construction and operation. The CVT 14 includes an input shaft 18, an output shaft 20, a continuously variable unit (CVU) 22 and a summing differential gearing assembly 24. The input shaft 18 is connected with the engine 12 for common rotation therewith, and the output shaft 20 is connected with the final drive 16 to provide input rotation thereto.

The CVU 22 is a conventional friction drive or traction unit such as a belt and sheave mechanism having an input sheave or pulley 26, an output sheave or pulley 28 and a flexible belt 30 rotatably interconnecting the pulleys 26 and 28. The construction and operation of the CVU is well-known. The relative axial positions of the half sheaves of each of the pulleys 26 and 28 is controlled by a hydraulic pressure and spring in a well-known manner. The drive ratio between the pulleys 26 and 28 is determined by the effective radius at which the belt 30 and the pulleys 26 and 28 are in frictional contact. As the axial spacing of the half sheaves of the pulley 26 is widened, the spacing between the half sheaves of the pulley 28 will be reduced which results in a reduction of the speed ratio between the pulleys 26 and 28. A maximum underdrive ratio is established when the axial spacing in the pulley 26 is at a maximum and the axial spacing of the pulley 28 is at a minimum, and a maximum overdrive ratio is established when the axial spacing of the pulley 26 is at a minimum and the axial spacing of the pulley 28 is at a maximum. In order to provide the maximum torque capacity for the CVU, the belt 30 is preferably constructed with a plurality of metal blocks secured in a continuous loop by a plurality of metal bands. This is a well-known construction.

The input pulley 26 is continuously connected with the input shaft 18 through a pair of meshing transfer gears 32 and 34. The input pulley 26 rotates in a direction opposite the engine rotation. For the purpose of this disclosure, the engine rotary direction will be considered to be clockwise (CW) and the speed value will be considered to be unity. Thus the input pulley 26 will rotate counterclockwise (CCW). The output pulley 28 will also rotate CCW.

A shaft 36 is connected with the output pulley 28 and with a sprocket 38 which in turn is connected by a chain 40 to a sprocket 42. The sprocket 38 is operatively connected with a selectively engageable, fluid operated rotatable torque transmitting mechanism (clutch) 44 and the sprocket 42 is operatively connected with a selectively engageable, fluid operated rotatable torque transmitting mechanism (clutch) 46. The torque transmitting mechanisms 44 and 46 are conventional mechanisms that are controlled in engaged and disengaged conditions by a conventional electro-hydraulic control system, not shown, which includes a programmable digital computer. The electro-hydraulic control also provides the pulleys 26 and 28 with pressurized hydraulic fluid to control the axial spacing of the half sheaves thereof. The torque transmitting mechanism 44 is also operatively connected with a transfer gear 48 that is disposed in meshing relation with a transfer gear 50 which is continuously connected with the output shaft 20. The torque transmitting mechanism 46 is operatively connected with a sleeve shaft 52 which is continuously connected with a sun gear member 54, a component of the summing differential gearing assembly 24.

The summing differential gearing assembly 24 also includes a sun gear member 56 and a planet carrier assembly member 58. The sun gear member 56 is continuously connected with the input shaft 18 and therefore rotates in a CW direction with the engine 12. The planet carrier assembly member 58 includes a carrier 60 that rotatably supports a plurality of short pinion gear members 62 and a plurality of long pinion gear members 64. The short pinion gear members 62 and the long pinion gear members 64 are disposed in intermeshing relation. The short pinion gear members 62 also mesh with the sun gear member 54. The long pinion gear members 64 also mesh with the sun gear member 56. The sun gear member 54 rotates in unison with the sprocket 42 when the torque transmitting mechanism 46 is engaged. The direction of rotation of the sun gear member 54 is CCW when the torque transmitting mechanism 46 is engaged which is the direction of rotation of the pulley 28. The planet carrier assembly member 58 is continuously connected with the output shaft 20. The direction of rotation of the carrier 60 of the planet carrier assembly member 58 is determined by the rotary speed and tooth ratio of the sun gear members 54 and 56.

Since the speed of the sun gear member 56 and the input pulley 26 are fixed, relative to the input shaft 18, the carrier 60 can be made to rotate both forward (engine direction) and backward. Therefore, the output shaft 20 has a forward range and a reverse range depending on the speed ratio of the CVU 22. The speed ratio of the CVU 22 is controllable between a maximum underdrive and a maximum overdrive. At the maximum overdrive ratio, the sun gear member 54 will rotate CCW at its fastest speed and the output shaft 20 will rotate CCW at the maximum speed of the reverse range when the torque transmitting mechanism 46 is engaged and the torque transmitting mechanism 44 is disengaged. During the ratio change in the CVU 22 from the maximum underdrive to the maximum overdrive, the rotation of the output shaft 20 will change from forward to reverse. This is a geared neutral condition. Both sun gear members 54 and 56 are rotating but the carrier 60 and output shaft 20 are stationary.

At the maximum underdrive condition in the CVU 22, the transfer gear 48 is rotating at the same speed as the transfer gear 38. Therefore, the torque transmitting mechanism 44 can be engaged without slippage (synchronous engagement) and the torque transmitting mechanism 44 is simultaneously disengaged. This will effectively disconnect the power flow through the summing differential gearing assembly 24 and connect the power flow path through the transfer gears 48 and 50. When the torque transmitting mechanism swap is completed, the ratio of the CVU 22 can be manipulated toward the maximum overdrive condition to further increase the speed of the output shaft 20. This is the high forward range. All of the power flow is directed through the CVU 22 during this range.

Figure 2:
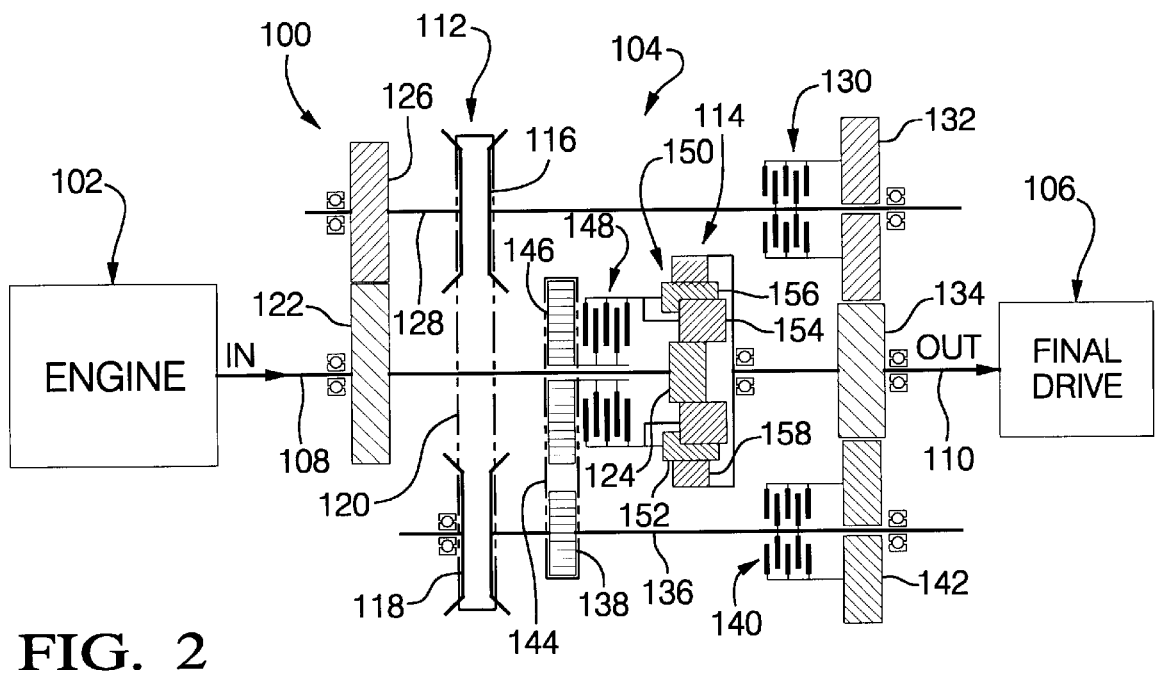
FIG. 2 is a schematic representation of another embodiment of a CVT incorporating the present invention.

A powertrain 100, shown in FIG. 2, includes a conventional engine 102, a CVT 104, and a conventional final drive gearing 106. The CVT 104 has an input shaft 108, an output shaft 110, a CVU 112 and a summing differential gearing assembly 114. The CVU 112 is a conventional friction or traction drive which is illustrated as being a belt and pulley mechanism. The CVU 112 has an input pulley 116, an output pulley 118 and a flexible belt 120 that frictionally engages the pulleys 116 and 118. The pulleys 116 and 118 have sheave halves that are axially adjustable to vary the drive ratio therebetween with hydraulic power supplied by a conventional electro-hydraulic control, not shown.

The input shaft 108 is continuously connected with a transfer gear 122 and a sun gear member 124 of the summing differential gearing assembly 114. The transfer gear 122 meshes with a transfer gear 126 that is drivingly connected with a transfer shaft 128 which is continuously connected with the input pulley 116 and operatively connected with a fluid operated, selectively engageable torque transmitting mechanism 130. The torque transmitting mechanism 130 is also operatively connected with a transfer gear 132 such that when, the torque transmitting mechanism 130 is engaged, the transfer gear 132 will rotate with the transfer shaft 128 at a speed proportional to the speed of the input shaft 108. The transfer gear 132 meshes with a transfer gear 134 that is fixed for common rotation with the output shaft 110.

The output pulley 118 is secured to a transfer shaft 136 that is continuously connected with a transfer sprocket 138 and operatively connected with a fluid operated, selectively engageable torque transmitting mechanism 140 which is operatively connected with a transfer gear 142. When the torque transmitting mechanism 140 is engaged, the transfer gear 142 will rotate in unison with the output pulley 118. The transfer gear 142 is disposed in meshing relation with the transfer gear 134.

The transfer sprocket 138 is connected by a chain 144 with a transfer sprocket 146 that is operatively connected with a fluid operated, selectively engageable torque transmitting mechanism 148 which is operatively connectable with a planet carrier assembly member 150 of the summing differential gearing assembly 114. When the torque transmitting mechanism 148 is engaged, the planet carrier assembly member 150 will rotate in unison with the sprocket 146 at a speed proportional to the speed of the output pulley 118. The planet carrier assembly member 150 includes a carrier member 152 that rotatably supports a plurality of intermeshing pinion gear members 154 and 156 that mesh, respectively, with the sun gear member 124 and a ring gear member 158. The ring gear member 158 is continuously connected with the output shaft 110.

The sun gear member 124 rotates in the same direction as the input shaft 108 and at a speed equal to the speed of the input shaft 108. The input pulley 116 rotates in a direction opposite to the input shaft 108 and at a speed proportional to the speed of the input shaft 108 as determined by the tooth ratio of the transfer gears 122 and 126. The output pulley 118 rotates in the same direction as the input pulley 116 at a speed proportional thereto as determined by the ratio of the effective diameters of the pulleys 116 and 118. This ratio is variable between a maximum underdrive ratio and a maximum overdrive ratio.

The sun gear member 124 rotates in the same direction as the engine 102 and the input shaft 108. When the torque transmitting mechanism 148 is engaged, the carrier 152 member rotates in the opposite direction. The ring gear member 158 rotates in a direction as determined by the speed of the sun gear member 124, the carrier member 152 and the tooth ratio of the ring gear member 158 and the sun gear member 124. The ring gear member 158 can rotate forwardly (engine direction) or reversely (CVU direction).

As with the CVT 14, the CVT 104 has a geared neutral condition at which the sun gear member 124 (engine speed/unity) and the carrier member 152 (CVU ratio) are rotated at speeds that permit the speed of the ring gear member 158 to be zero. When the ratio of the CVU 114 is adjusted from the neutral condition toward the maximum overdrive condition, the output shaft 110 will rotate opposite to the rotational direction of the input shaft 108. When the ratio of the CVU 114 is adjusted toward the maximum underdrive ratio, the output shaft 110 will rotate in the same direction, at a reduced ratio, as the input shaft 108.

When the ratio of the CVU 114 is at the maximum underdrive ratio, the shaft 136 and the transfer gear 142 are rotating at the same speed which permits a synchronous engagement of the torque transmitting mechanism 104 while the torque transmitting mechanism 148 is disengaged. The output shaft speed will remain constant through the torque transmitting mechanism interchange. After the interchange, the ratio of the CVU 114 is adjusted toward the maximum overdrive ratio to increase the speed of the output shaft 110 up to the maximum vehicle speed.

The transfer gear 132 is rotated at a speed proportional to the speed of the input shaft 108 when the torque transmitting mechanism 130 is engaged. This will establish a fixed mechanical ratio between the engine 102 and the output shaft 110. This fixed ratio is determined by the tooth ratio of the transfer gears 122 and 126 and the tooth ratio of the transfer gears 132 and 134. The fixed mechanical ratio is preferably designed to occur between the limits of the ratio range of the CVU 114. This will permit a mechanical power path, consisting of the transfer gears 122, 126, 132, and 134, to be established during the operation of the vehicle to provide an efficient operating ratio during the forward high range. The fixed mechanical ratio and the ratio of the CVU power path are equal at some point during the forward high range. At this point the torque transmitting mechanism 130 is engaged and the torque transmitting mechanism 140 can remain engaged. To permit extended operation at the fixed mechanical ratio, the CVU ratio is decreased to match the fixed mechanical ratio, the vehicle is then permitted to accelerate along the fixed ratio path for a brief interval, and the CVU ratio is then re-established at the higher vehicle speed.

An alternative operating schedule is also possible with the present invention. During this alternate schedule, the fixed mechanical ratio is engaged (torque transmitting mechanism 130 engaged) at a first throttle setting (20%) and the CVU power path is disconnected (torque transmitting mechanism 140 released). The throttle setting is then increased to permit increased vehicle speed using the mechanical power path for improved fuel efficiency. At a higher throttle setting (i.e. 50%), the CVU power path is re-established (torque transmitting mechanism 140 engaged) and the mechanical power path is released (torque transmitting mechanism 130 disengaged). The ratio of the CVU 112 will be the same before and after the use of the fixed mechanical ratio. By way of example, the CVU ratio can vary to establish an overall ratio from 0.30 underdrive to 1.80 overdrive. The fixed mechanical ratio can be designed to be equal to an overall ratio of 1.40. Thus, whenever the overall ratio is to pass through the 1.40 ratio, the mechanical power path can be utilized to improve the operating efficiency of the vehicle.

Figure 3:
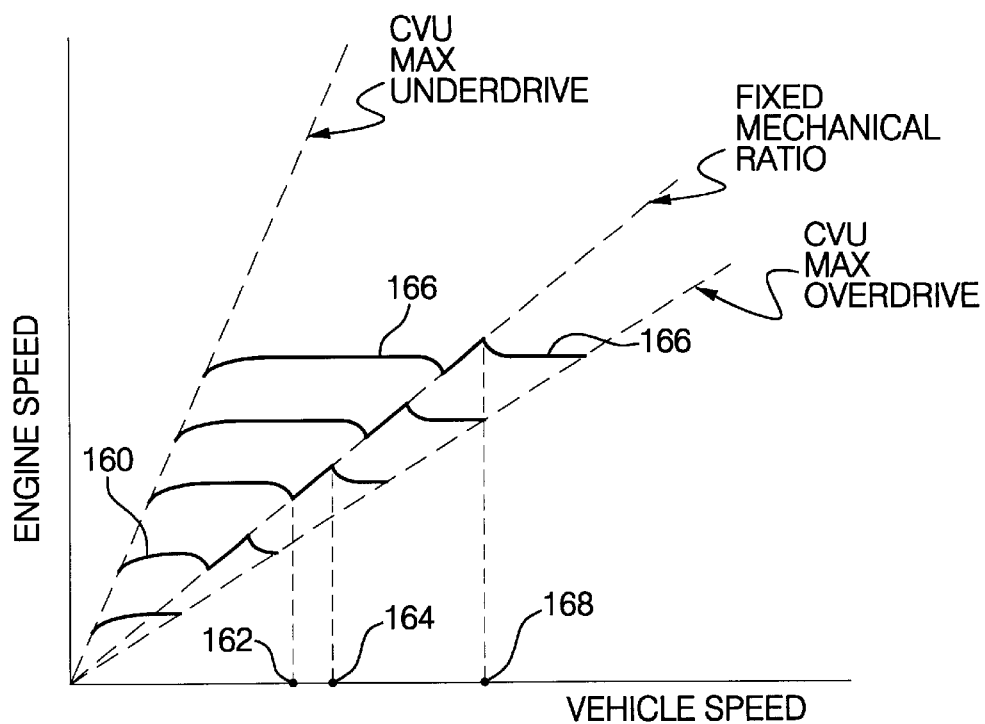
FIG. 3 is a plot of engine speed and vehicle speed for a plurality of throttle settings which describe some of the operating characteristics of the CVT described in FIG. 2.

This operation is depicted in the plot of operating characteristics shown in FIG. 3. The engine throttle is adjusted along the maximum underdrive ratio to increase the vehicle speed. When a desired throttle setting is achieved, as shown at line 160, the CVU ratio is adjusted toward the maximum overdrive ratio. The CVU ratio is continuously varied until the ratio is slightly greater than the fixed mechanical ratio at which point the torque transmitting mechanism 130 is engaged and all of the engine power passes through the mechanical power path. Due to the increase in overall efficiency, the vehicle speed will increase along the fixed mechanical ratio between the points 162 and 164 at which time the torque transmitting mechanism 130 will be disengaged and the CVU power path will be re-established.

An alternative operating process is also available. During this operating sequence, the torque transmitting mechanism 130 is engaged and the torque transmitting mechanism 140 is disengaged at the throttle setting represented by the line 160. The engine throttle is then increased until a throttle setting represented by the line 166 is reached and the torque transmitting mechanisms 130 and 140 are interchanged at the point and the CVU ratio is adjusted toward the maximum overdrive ratio along the throttle line 166. It should be noted that the vehicle speed was increased from point 162 to point 168 during this procedure by a change in throttle position only. The high efficiency of the mechanical power path is employed during this speed change. As is well-known, the CVU 112 undergoes some slippage of the belt 120 at the pulleys 116 and 118 which accounts for the efficiency loss. For this reason, the CVU ratio is slightly higher than the fixed mechanical ratio during the interchanges. The slight ratio change necessary is accommodated by the torque transmitting mechanisms 130 and 140.

Figure 4:
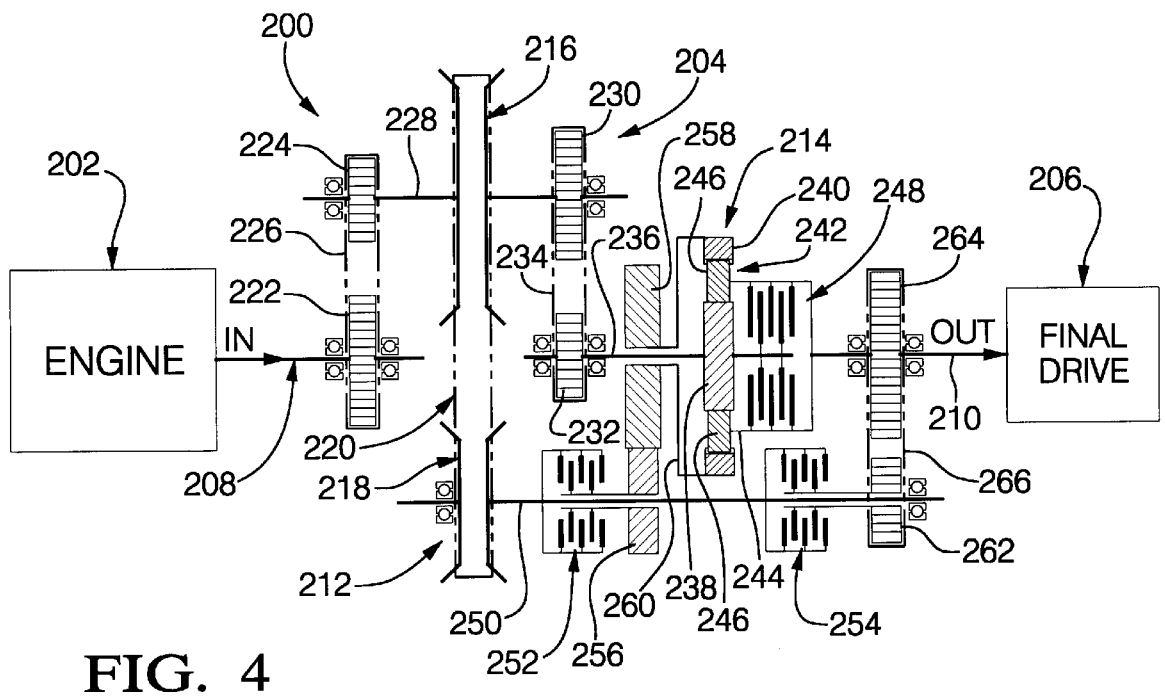
FIG. 4 is a schematic representation of yet another embodiment of a CVT incorporating the present invention.

A powertrain 200, shown in FIG. 4, includes a conventional engine 202, a CVT 204 and a conventional final drive gearing 206. The CVT 204 has an input shaft 208, an output shaft 210, a CVU 212 and a summing differential gearing assembly 214. The CVU 212 is comprised of an input pulley 216, an output pulley 218 and a flexible belt 220 that interconnects the pulleys 216 and 218 to transmit power therebetween. The pulleys 216 and 218 have sheaves that can be adjusted in the axial direction to change the drive ratio therebetween. The input shaft 208 is drivingly connected with the engine 202 and a sprocket 222. The sprocket 222 is connected with a sprocket 224 through a chain 226. Both sprockets 222 and 224 rotate in the same direction as the engine 202.

The sprocket 224 is connected with a shaft 228 that is also drivingly connected with the input pulley 216 and a sprocket 230. The sprocket 230 is drivingly connected with a sprocket 232 by a chain 234. The sprocket 232 is connected for continuous co-rotation with a shaft 236. The input pulley 216, output pulley 218, sprocket 230, sprocket 232 and shaft 236 all rotate in the same direction as the engine 202.

The shaft 236 is continuously drivingly connected with a sun gear member 238 of the summing differential gearing assembly 214. The summing differential gearing assembly 214 also includes a ring gear member 240 and a planet carrier assembly member 242 that has a planet carrier 244 on which is rotatably mounted a plurality of pinion gear members 246 that mesh with both the sun gear member 238 and the ring gear member 240. The planet carrier 244 is continuously connected with the output shaft 210 and operatively connected with a torque transmitting mechanism 248 which is also operatively connected with the sprocket 232 and sun gear member 238 through the shaft 236. The torque transmitting mechanism 248 is a conventional fluid operated, selectively engageable mechanism that, when engaged, will cause the sun gear member 238 and the planet carrier 244 to rotate in unison with the output shaft 210.

The output pulley 218 is continuously connected for common rotation with a shaft 250 that is operatively connected with a pair of conventional fluid operated, selectively engageable torque transmitting mechanisms 252 and 254. The torque transmitting mechanism 252 is operatively connected with a transfer gear 256 that meshes with a transfer gear 258 which in turn is continuously drivingly connected with the ring gear member 240 through a hub 260. When the torque transmitting mechanism 252 is engaged, the ring gear member 240 will rotate at a speed proportional to the output pulley 218 but in a direction opposite thereto. The drive ratio between the output pulley 218 and the ring gear member 240 is determined by the tooth ratio of the transfer gears 256 and 258.

The torque transmitting mechanism 254 is operatively connected with a sprocket 262 which is continuously connected with a sprocket 264 through a chain 266. The sprocket 264 is continuously connected with the output shaft 210. When the torque transmitting mechanism 254 is engaged, the output pulley 218 and the output shaft 210 will rotate in unison. The drive ratio between the output pulley 218 and the output shaft 210 is determined by the tooth ratio of the sprockets 262 and 264. The output shaft 210 will rotate in the same direction as the engine 202 when the torque transmitting mechanism 254 is engaged. The overall ratio between the engine 202 and the output shaft 210 is determined by the ratio of the CVU 212 and the tooth ratio of the sprockets 222 and 224 and the tooth ratio of the sprockets 262 and 264.

When the torque transmitting mechanism 252 is engaged, the CVT 204 is conditioned to provide a reverse range, a geared neutral condition, and a low forward range. During the engagement of the torque transmitting mechanism 252, the sun gear member 238 and the ring gear member 240 are rotating in opposite directions. The sun gear member 238 rotates in the same direction as the engine 202 at a ratio relative thereto that is determined by the tooth ratio of the sprockets 222 and 224 and the tooth ratio of the sprockets 230 and 232. The ring gear member 240 rotates opposite the direction of the engine 202 at a ratio determined by the tooth ratio of the sprockets 222 and 224 and the drive ratio of the CVU 212. Thus the speed of the ring gear member 240 can be varied within the range of the CVU ratio which is adjustable between a maximum underdrive and a maximum overdrive. Since the speed and direction of the planet carrier 244 of the planet carrier assembly member 242 is determined by the tooth ratio of the ring gear member 240 and the sun gear member 238 and the speed and direction of the sun gear member 238 and the ring gear member 240, the speed of the planet carrier 244 and therefore output shaft 210 is variable. The planet carrier can be rotated at a maximum reverse speed when the CVU ratio is at a maximum overdrive ratio and at a maximum low forward range speed when the CVU ratio is at a maximum underdrive ratio. At a predetermined ratio of the CVU between these maximum extremes, the planet carrier 244 and the output shaft 210 will be stationary (geared neutral).

When the maximum underdrive ratio is set at the CVU 212, the sprocket 262 will be rotating at the same speed as the output pulley 218 and the shaft 250. When this condition is achieved, the torque transmitting mechanisms 252 and 254 are synchronously interchanged and the CVT 204 is conditioned for a high forward range. During the high forward range, the CVU ratio is varied from the maximum underdrive ratio toward the maximum overdrive ratio to increase the speed of the output shaft 210. During this forward range, the torque transmitting mechanism 248 can be engaged at a specific predetermined overall ratio of the CVT 204. As described above for the CVT 104 of FIG. 2, with reference to the operating characteristics described in FIG. 3, a mechanical drive path is established which increases the operating efficiency of the CVT.

What is claimed is:

1. A powertrain having a continuously variable transmission, said transmission comprising:

an input shaft connected to receive power from an engine;

an output shaft connected to deliver power from said transmission;

a continuously variable unit having a CVU input member continuously connected with said input shaft and a CVU output member;

a summing differential gearing assembly having a first differential input member continuously connected for common rotation with said input shaft to provide a continuous fixed ratio input drive to said summing differential gearing assembly, a second differential input member, and a differential output member continuously connected for common rotation with said output shaft;

a first torque transmitting mechanism operatively connectable between said CVU output member and said second differential input member to deliver a variable ratio input drive to said summing differential gearing assembly in a rotational direction opposite the rotational direction of said fixed ratio input drive;

a second torque transmitting mechanism operatively connectable between said CVU output member and said output shaft to deliver a variable ratio drive between said input shaft and said output shaft in bypassing relation to said summing differential gearing assembly; and said continuously variable unit being adjustable to deliver drive ratios within a range of values including a maximum overdrive ratio and a maximum underdrive ratio.

2. The transmission defined in claim 1 further comprising:

a third torque transmitting mechanism selectively operatively connectable between said input shaft and said output shaft to provide a fixed mechanical ratio therebetween.

3. The transmission defined in claim 2 further comprising:

said fixed mechanical ratio having a value within said range of values including said maximum underdrive ratio and said maximum overdrive ratio.

4. The transmission defined in claim 2 further comprising:

said third torque transmitting mechanism being disposed in bypass power flow relation with said summing differential gearing assembly.

5. The transmission defined in claim 1 further comprising:

said summing differential gearing assembly comprising a planetary gear set having at least a sun gear member and a planet carrier assembly member and a third member, said first differential input member being the sun gear member.

6. The transmission defined in claim 5 further comprising:

said planet carrier assembly being either said second differential input member or said differential output member and said third member being the other of said second differential input member and said differential output member.

7. A powertrain having a continuously variable transmission, said continuously variable transmission comprising:

an input shaft for receiving power from a prime mover;

an output shaft for delivering power from said continuously variable transmission;

a continuously variable ratio unit comprising a first selectively variable diameter pulley, a second selectively variable diameter pulley, and a flexible drive transmitter engaging said first and second pulleys, said input shaft being continuously connected with said first pulley, said pulleys being controllable to provide a continuously variable ratio between said input shaft and said second pulley within a predetermined range;

a summing differential gearing assembly having a first input member continuously connect with said input shaft to establish a mechanical drive path thereto, a second input member, and a third member being continuously connected with said output shaft;

a first torque transmitting mechanism selectively, operatively connectable between said second pulley and said second input member for establishing a first variable ratio path thereto;

a second torque transmitting mechanism selectively operatively connectable between said second pulley and said output shaft for establishing a second variable ratio path thereto in bypassing relation to said summing differential gearing assembly; and a third torque transmitting mechanism selectively operatively connectable between said mechanical drive path and said output shaft to establish a discrete drive ratio therebetween at a value encompassed by said predetermined range.

8. The continuously variable transmission defined in claim 7 further comprising:

said first variable diameter pulley being continuously rotatable with said mechanical drive path; and said first input member of said summing differential gearing assembly being a sun gear member, said second input member of said summing differential gearing assembly being one of a sun gear member and a planet carrier assembly member, and said third member of said summing differential gearing assembly being a planet carrier assembly member when said second member of said summing differential gearing assembly is a sun gear member and being a ring gear member when said second member of said summing differential gearing assembly is a planet carrier assembly member.

9. The continuously variable transmission defined in claim 7 further wherein:

power delivered to said mechanical path continuously rotates said first input member of said summing differential gearing assembly in a first directional sense, and power delivered to said first variable ratio path rotates said second input member of said summing differential gearing assembly in an opposite directional sense when said first torque transmitting mechanism is operative and said second variable ratio path rotates said output shaft in said first directional sense when said second torque transmitting mechanism is operative, and said power delivered to mechanical path rotates said output shaft in said first directional sense.

10. The continuously variable transmission defined in claim 9 further wherein:

said second torque transmitting mechanism and said third torque transmitting mechanism are simultaneously operative when the second variable ratio path and the discrete ratio are rotating said output shaft at substantially the same speed.

11. The continuously variable transmission defined in claim 9 further wherein:

said second torque transmitting mechanism and said third torque transmitting mechanism are simultaneously operative when the second variable ratio path and said mechanical path operating at the discrete ratio are rotating said output shaft at substantially the same speed, and said third torque transmitting mechanism being selectively inoperative when the ratio of the second variable ratio path is adjusted upward from said discrete ratio.

12. The continuously variable transmission defined in claim 9 further wherein:

said second torque transmitting mechanism and said third torque transmitting mechanism are simultaneously operative when the second variable ratio path and said mechanical path operating at the discrete ratio are rotating said output shaft at substantially the same speed, and said third torque transmitting mechanism being selectively inoperative when the ratio of the second variable ratio path is adjusted downward from said discrete ratio.

* * * * *